United States Patent [19]

Muhl et al.

[11] Patent Number: 4,960,803

[45] Date of Patent: Oct. 2, 1990

[54] FIRE RETARDANT FOAM MATERIALS

[76] Inventors: Laszlo A. Muhl, 6547 Corintia St., Carlsbad, Calif. 92209; Thomas I. Omori, 1601 Parway Dr., Glendale, Calif. 91206; John Milligan, 580 Gardina Ct., Encinitas, Calif. 92024

[21] Appl. No.: 227,548

[22] Filed: Jul. 29, 1988

Related U.S. Application Data

[63] Continuation-in-part of Ser. No. 78,025, Jul. 24, 1987, abandoned, which is a continuation of Ser. No. 911,013, Sep. 29, 1986, abandoned.

[51] Int. Cl.$^5$ ................................................. C08J 9/00
[52] U.S. Cl. .................................... 521/106; 521/155; 521/906
[58] Field of Search ......................... 521/106, 155, 906

[56] References Cited

U.S. PATENT DOCUMENTS

| | | | |
|---|---|---|---|
| 3,933,701 | 1/1976 | Puig et al. .......................... | 521/174 |
| 4,284,826 | 8/1981 | Aelony ............................... | 521/128 |
| 4,349,494 | 9/1982 | Fulmer ............................... | 521/906 |
| 4,451,583 | 5/1984 | Chesler .............................. | 521/137 |
| 4,482,582 | 11/1984 | Weisman ........................... | 521/137 |
| 4,497,913 | 2/1985 | Roes et al. ......................... | 521/137 |
| 4,506,040 | 3/1985 | Rals et al. .......................... | 521/137 |
| 4,569,952 | 2/1986 | Radovich et al. .................. | 521/167 |
| 4,614,754 | 9/1986 | Christman ......................... | 521/167 |
| 4,664,563 | 5/1987 | Christman ......................... | 521/167 |
| 4,792,576 | 12/1988 | Nodelman .......................... | 521/174 |

Primary Examiner—Morton Foelak
Attorney, Agent, or Firm—Lieberman, Rudolph & Nowak

[57] ABSTRACT

A method is provided for making a fire retardant rigid polyurethane foam. The method comprises reacting, in the presence of a non-metallic catalyst: (a) a polyol having a molecular weight between about 200 and about 6000; (b) polyisocyanate; (c) a foaming agent; (d) a surfactant; and (e) a single salt consisting of ammonium phosphate.

14 Claims, No Drawings

FIRE RETARDANT FOAM MATERIALS

This application is a continuation-in-part of U.S. application, Ser. No. 078,025, filed July 24, 1987 which is a continuation of Ser. No. 911,013 filed Sept. 29, 1986, both now abandoned the entire contents of both the parent and grandparent application being incorporated herein by reference.

FIELD OF THE INVENTION

The invention is directed generally to polyurethane foams and specifically to polyurethane foams having fire retardant properties.

BACKGROUND OF THE INVENTION

The term polyurethane refers to the class of chemical compounds obtained by the reaction of a polyisocyanate with materials containing hydroxyl groups such as polyesters, polyethers, or glycols. Foamed polyurethane materials are generally formed by the reaction of a polyhydroxyl compound ("polyol"), with a polyisocyanate in the presence of a foaming agent. The term polyurethane, as used herein, also refers to polymers containing urea groups resulting from the polyisocyanate reaction with amines or water ("polyisocyanurates"). Rigid polyurethane foams are widely used in the construction and building industries. They are easily molded, sprayed, or cast onto steel, glass-reinforced plastics, or other parts where they protect valuable machinery, or other wear-prone surfaces. They can also be used as synthetic woods, baffles, or as core material for hollow structures such as airplane wings and wall panels. Rigid polyurethane foams provide abrasion and corrosion resistance, high tensile, compression and tear strength, and oil and solvent resistance.

A well-recognized problem with polyurethane foams, however, is the flammable nature of polyurethanes. Not only are polyurethanes generally highly flammable, but the gases given off during combustion ca be highly toxic. The prior art is replete with attempts at making polyurethane foams more fire resistant. Most such methods entail incorporating fire retardant additives into the foam and/or covering the foam with a fire retardant coating. None of the prior art methods are wholly satisfactory. Such methods tend to impair the physical properties of the foam, and/or they tend to drive up the cost of manufacturing the foam.

There is, therefore, a need for a fire retardant polyurethane foam which has substantially the same physical properties as ordinary foams.

There is also a need for a fire retardant polyurethane foam which will not be substantially more expensive to manufacture than ordinary foams.

SUMMARY OF THE INVENTION

The invention satisfies these needs. The invention comprises a polyurethane foam comprising the reaction product of: (a) a polyol having a molecular weight between about 200 and about 6000; (b) a polyisocyanate; (c) a foaming agent; (d) a surfactant; (e) selected catalysts; and (f) a single salt consisting of ammonium phosphate, as hereinafter defined. The invention further comprises a method for making a fire retardant polyurethane by reacting in the presence of a non-metallic catalyst: (a) a polyol having a molecular weight between about 200 and about 6000; (b) a polyisocyanate; (c) a foaming agent; (d) a surfactant; (e) selected catalysts; and (f) a single salt consisting of ammonium phosphate. The invention further comprises the polyurethane composition prepared by the foregoing method.

DETAILED DESCRIPTION OF THE INVENTION

The invention provides a novel class of relatively inexpensive polyurethane compositions having excellent physical properties and outstanding fire retardant properties. The polyurethane compositions of the invention are highly useful in preparing rigid polyurethane foam products.

The invention comprises a polyurethane composition prepared by reacting in the presence of a non-metallic catalyst: (a) a polyol having a molecular weight between about 200 and about 6000; (b) a polyisocyanate; (c) a foaming agent; (d) a surfactant; (e) selected catalysts; and [f] a single salt consisting of ammonium phosphate.

The term "polyol", as used herein, means any organic compound, or mixtures of compounds, containing hydroxyl groups, the compound or mixture having a hydroxyl number greater than about 50 mg KOH/g. Examples of such compounds include polyesters, polyethers, castor oils and glycols. Polyols useful in the invention have a molecular weight between about 200 and about 6000. Lower molecular weights will not yield strong foams. Higher molecular weights have a high viscosity and are difficult to blend. A polyol particularly useful in the invention is marketed by Jefferson Chemical Company, Inc. as THANOL R650X. THANOL R650X has a hydroxyl number of 440–460 mg KOH/g. It also contains a non-metallic catalyst of the type useful in the invention. The incorporation of the catalyst into the polyol is a convenience to the user since separate addition of such catalyst is, therefore, not necessary during product preparation.

Polyisocyanates useful in the invention include tolylene diisocyanate (TDI), methylenediphenylisocyanate (MDI), polymeric isocyanates (PMDI), aliphatic diisocyanates and mixtures thereof. For rigid foams produced by the method of the invention, the preferred polyisocyanate is MDI, such as MDI type isocyanate MR marketed by Mobay Chemical Company.

The foaming agent can be any gas, or gas precursor, which will cause the reaction mixture to foam under reaction conditions. Examples of suitable foaming agents include freon, nitrogen, volatile organic liquids and water (which reacts with excess isocyanate to liberate carbon dioxide during the reaction). The preferred foaming agent is freon, such as Freon F11B type trichloromonofluoromethane, having a boiling point of about 77° F.

The surfactant can be any material capable of stabilizing the foam cell structure during the reaction. The preferred surfactants, because of their excellent cell structure stabilizing ability, are silicone-based surfactants such as L5420 Surfactant marketed by the Union Carbide Company.

The last component of the polyurethane composition, as indicated above, is ammonium phosphate. This salt imparts the desired fire retardant properties to the foamed product and has the additional advantage of being relatively inexpensive. Moreover, the ammonium phosphate is employed alone, as the sole fire retardant agent.

In practice, it has been noted that the particle size of the ammonium phosphate, as well as the bimodal distribution of the particles and chemical compositions, are important features of the present invention if optimum fire retardant properties are to be achieved, while at the same time providing foams of the desired physical characteristics.

Accordingly, in order to obtain polyurethane foams having optimum properties, the particle size of the ammonium phosphate salt must be between about 150 and 300 mesh. Particle size closer to 300 mesh is preferred. Particles smaller than about 300 mesh are more difficult to handle, but can be used. Larger products tend to yield products having reduced physical properties, especially reduced shear strength. Larger particles also tend to yield properties having reduced thermal conductive properties such as K factor and R factor. Very large particles are also difficult to mix.

A preferred embodiment of the invention uses a bimodal distribution of small and large particles, such as a 50:50 mixture of 150 mesh and 300 mesh particles. Bimodal mixtures tend to distribute better during product preparation, yielding products having a uniform, well-formed matrix structure and exhibiting excellent physical an fire retardant properties.

In addition to the above physical properties, it is important that the ammonium phosphate have a minimum assay for phosphorous pentoxide of 47 percent and an ammonium nitrogen content of 10 percent.

The ammonium phosphate, which is employed in the polyurethane composition of the present invention, can be obtained from a variety of sources, as long as it is of the proper particle size. In practice, it has been found that agricultural grade ammonium phosphate commonly designated as 11-55-D and marketed by Cargil Company or Slmplot Company, provides satisfactory results.

In one embodiment of the method of the invention, the reactive ingredients comprise 100 parts by weight of MDI and between about 80.0 and about 120 parts polyol, preferably between about 85 and about 95 parts. Too little polyol, and too much polyol, leads to incomplete polymerization during the reaction step and a failure of the reaction product to form a strong, uniform foam.

The reactive ingredients further comprise between about 10 and about 50 parts by weight foaming agent, preferably between about 20 and 30 parts. Higher concentrations tend to result in a less dense product, and lower concentrations tend to result in a more dense product. For instance, where the foaming agent is freon, increasing the foaming agent concentration by 10 to 15 weight percent will result in a product density decrease of about 30 weight percent.

The reactive ingredients further comprise between about 0.5 and about 2 parts weight surfactant, preferably between about 1.0 and about 1.5 part. Too little surfactant will result in an underdeveloped, irregular foam. Excessive quantities of surfactant are uneconomical.

The reactive ingredients further comprise between about 20 and about 200 parts by weight of the ammonium phosphate salt, preferably between about 20 and 50 parts. The salt may constitute between about 10 and about 50 weight percent of the total ingredients. Lower concentrations result in products having reduced fire retardant properties. Higher concentrations result in overly dense materials having only marginally increased fire retardancy.

The polyurethane foams of this invention may be formed in accordance with any of the processing techniques known to the art. It is understood that the relative amounts of the various components of the foam formulation are not narrowly critical. The polyether, polyol and polyisocyante are present in the foam-producing formulation in a major amount. Preferably for ease of mixing, the ratio of the polyol-containing component to the polyisocyanate-containing component is about 50:50, more preferably about 58:42. Preferably, the salt particles are homogeneously combined with the polyol component with a mill such as a Koruma mill, or other suitable mixing equipment.

The polyurethane compositions of the inventions can further comprise a wide variety of other ingredients such as pigments, resins and extenders, for the purpose of imparting particular physical properties to the product. In most cases, the addition of such other ingredients does not appreciably reduce the excellent fire retardant properties of the compositions.

The components can be reacted at atmospheric pressure at between about 40° and about 140° F. The reaction is carried out in the presence of a non-metallic catalyst. Any non-metallic material, which is catalytically active in the polyurethane reaction, can be used. Amino-functional polyurethane catalysts such as LV33 Catalyst, marketed by Air Products and Chemicals, Inc., are suitable in the invention. The catalyst can be added to the reactants during the reaction step, or it can be added to the polyol-containing component prior to the reaction step.

Rigid foam polyurethanes, prepared by the method of the invention, are characterized by excellent physical properties and outstanding fire retardant properties. Polyurethanes of the invention are very difficult to ignite and, if ignited, self-extinguish when removed from the ignition source. During ignition, the material intumeces to quickly form a continuous, insulative char, which shields the interior of the material from heat and oxygen, and which inhibits the emission from the interior of smoke and toxic gases. The polyurethanes of the invention have excellent physical properties, physical properties comparable to ordinary polyurethane foams, and are less expensive to prepare than most "fire resistant" polyurethane foams of the prior art.

EXAMPLE 1

In this example, a polyurethane foam is prepared by reacting a mixture of 94 parts by weight of a polyol component, 106 parts by weight of an isocyanate component, and 30 parts by weight of a single salt, ammonium phosphate.

The polyol component consists of, in parts by weight, the following ingredients:

| Ingredient | Quantity |
|---|---|
| Blend A | 71.00 |
| Surfactant DC-193 | 1.25 |
| Catalyst Polycat 46 | 2.00 |
| Catalyst TMR-30 | 1.00 |
| Blow mg Agent Freon F-11 | 24.75 |
| | 100.00 |

Wherein Blend A is comprised of:

| | |
|---|---|
| 1. Chardonnal 570 (An aromatic polyester | 44.0 parts |

-continued

| | |
|---|---|
| polyol; an aromatic ester made from polyethylene terethalates) | |
| 2. Surfonic N-95 (A 9 mol. adduct/ ethoxylate of nonylphenyl) | 20.00 parts |

The isocyanate component consists of, in parts by weight:

| Ingredient | Quantity |
|---|---|
| MDI - (methylene-diphenyl isocyanate) functionality of at least 3 Mobay Chem Co. | 100.00 |

The salt component, as previously indicated, is agricultural grade 11-55-D, having a bimodal distribution of about 50 percent by weight of 150 mesh particles, and about 50 percent by weight of 300 mesh particles.

The resulting foam exhibits excellent fire retardant properties.

Although the present invention has been described in considerable detail with reference to certain preferred versions, other versions are possible. Therefore, the spirit and scope of the appended claims should not be limited to the description of the preferred versions contained herein.

What is claimed is:

1. A fire retardant polyurethane foam, prepared by the process of reacting in the presence of a non-metallic catalyst,
   (a) from about 80 parts to about 120 parts by weight of a polyol having a molecular weight of from about 200 to about 6000;
   (b) from about 80 parts to about 120 parts by weight of a polyisocyanate;
   (c) from about 10 parts to about 50 parts by weight of a foaming agent;
   (d) from about 0.05 to about 2.0 parts by weight of a surfactant;
   (e) a flame-retardant consisting essentially of from about 20 parts to about 200 parts by weight of a single salt consisting of ammonium phosphate having a particle size less than or equal to about 150 mesh.

2. The polyurethane foam of claim 1, wherein the salt is comprised of a blend of two different sizes of ammonium phosphate particles.

3. The polyurethane foam of claim 2, wherein the blend is a mixture of ammonium particles having a 150 mesh size and particles having a 300 mesh size.

4. The polyurethane foam of claim 3, wherein the blend is a bimodal distribution and contains approximately equal amounts by weight of the two particle sizes.

5. The polyurethane foam of claim 1, wherein the ammonium phosphate is agricultural grade.

6. The polyurethane foam of claim 1, wherein the ammonium phosphate has a minimum assay for phosphorous pentoxide of at least 47 percent.

7. The polyurethane foam of claim 1, wherein the ammonium phosphate has an ammonium nitrogen content of at least about 10 percent.

8. A process for the preparation of a fire retardant polyurethane foam, which comprises reacting in the presence of a non-metallic catalyst;
   (a) from about 80 parts to about 120 parts by weight of a polyol having a molecular weight of from about 200 to about 6000;
   (b) from about 80 parts to about 120 parts by weight of a polyisocyanate;
   (c) from about 10 parts to about 50 parts by weight of a foaming agent;
   (d) from about 0.05 to about 2.0 parts by weight of a surfactant;
   (e) a flame-retardant consisting essentially of from about 20 parts of about 200 parts by weight of a single salt consisting of ammonium phosphate having a particle size less than or equal to about 150 mesh.

9. The process of claim 8, wherein the salt is comprised of a blend of two different sizes of ammonium phosphate particles.

10. The process of claim 9, wherein the blend is a mixture of ammonium phosphate particles having a 150 mesh size and particles having a 300 mesh size.

11. The process of claim 10, wherein the blend is a bimodal distribution and contains approximately equal amounts by weight of the two particle sizes.

12. The process of claim 8, wherein the ammonium phosphate is agricultural grade.

13. The process of claim 8, wherein the ammonium phosphate has a minimum assay for phosphorous pentoxide of at least 47 percent.

14. The process of claim 8, wherein the ammonium phosphate has an ammonium nitrogen content of at least about 10 percent.

* * * * *